Inventors:
Carlyle S. Herrick,
Theodore L. Etherington,
by Paul A. Frank
Their Attorney.

United States Patent Office 3,079,087
Patented Feb. 26, 1963

3,079,087
METHOD AND APPARATUS FOR STORING AND RECOVERING HEAT
Carlyle S. Herrick, Alplaus, and Theodore L. Etherington, Ballston Lake, N.Y., assignors to General Electric Company, a corporation of New York
Filed Dec. 13, 1956, Ser. No. 628,078
3 Claims. (Cl. 237—1)

This invention relates to a method and apparatus for storing and recovering heat and, more particularly, to a system utilizing the stored latent heat of fusion.

Latent heat of fusion as an available source of heat may have wide application not only in industrial processes, but also in home heating. One method of obtaining latent heat heretofore employed, the static method, entails the transfer of the released heat of fusion of a stationary body of liquid, undergoing a change of state from liquid to solid, in a sealed container to a second fluid circulating about the container. This system, in order to be practicable, usually requires that a given amount of the heat storage material be confined in a container of maximum surface area in order to provide a high rate of heat transfer between the fusing liquid and the circulating fluid. This requirement stems from the occurrence of solidification of the heat storage material starting at the inner surface of the container walls and proceeding inwardly toward the center of the container. The fused solid thus presents an increasing resistance to the transfer of heat from the fusing liquid to the circulating fluid of lower heat content. Ultimately, a condition is finally reached where the heat transfer rate is reduced below that necessary for practicable utilization. However, a substantial remainder of the heat storage material still exists in the liquid state with no utilization of its stored heat. The static method of heat storage, therefore, provides an inefficient utilization of the total available stored energy. Further, the static method of heat storage often results only in a sub-cooling of the heat storage liquid without fusion, in which case, none of the heat of fusion of the material is usable.

Accordingly, it is an object of this invention to provide a high rate of heat transfer between a liquid undergoing a change of state and a heat exchange liquid.

It is another object of this invention to prevent subcooling of a fusing liquid in a heat storage system.

It is yet another object of this invention to minimize the requirement of a large amount of fusing liquid in a heat storage system.

A further object of this invention is to provide a compact, simplified, and economical heat storage system.

Briefly described, the dynamic heat storage system of this invention utilizes an intermingling or intermixing of liquids wherein one remains in liquid form and the other undergoes a change of state from a liquid to a solid. The fluid undergoing the change from a liquid to a solid functions as the heat storage liquid, whereas the fluid undergoing no change of state functions as the heat exchange liquid. The mixture or solution is circulated through a heat exchanger in which the liquid undergoing a change of state crystallizes in small particles thereby liberating latent heat of fusion which is absorbed by the heat exchange liquid. The solid crystals are maintained in a fluidized state in the heat exchange liquid in order to provide intimate contact and good heat transfer characteristics, and at the same time to facilitate the circulation thereof.

These and other advantages, features, and objectives will be better understood when taken in connection with the following description and drawings.

Figure 1:
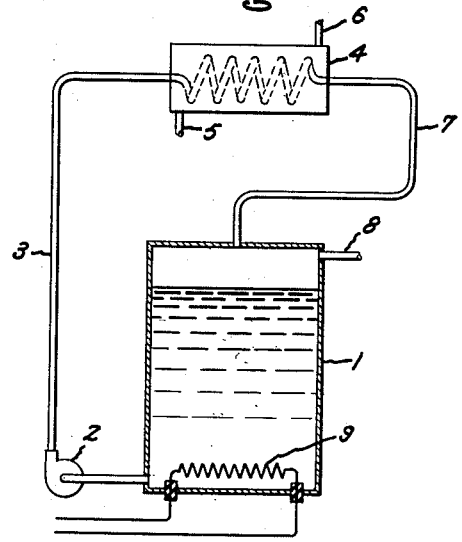
FIG. 1 is a schematic representation of one embodiment of this invention.

Referring now to FIG. 1, there is shown a suitable container 1 for the liquid mixture or solution employed. This invention is not to be considered restrictive to a mixture or solution of liquids, since a wide variety of components is available which will give good results. Included among these components are gases, liquid solutions, liquid mixtures, pure fused solids, or a solution of a liquid and some other material. The general requirement for a working component of this invention is that in a liquid mixture or a liquid solution, the liquids employed have different solidifying temperatures, and if a solution of a liquid and another material is used, such as water and disodium phosphate, the solution should be proportioned to provide solidification at a predetermined temperature. Another example of a working component of this invention, and one which will hereinafter be operatively described, is a water-methanol solution. The methanol in this solution has a much lower freezing temperature than that of water, and, depending on the temperature and solution, causes the water to freeze in small particles, thus forming a sludge or slurry instead of a solidified mass. The water-methanol solution in container 1 is withdrawn by means of a pump 2, and is pumped through a conduit 3 to enter a suitable heat exchanging apparatus 4. When immiscible liquids are employed in this invention any suitable mixing means may be utilized to premix the liquids before being withdrawn by the pump 2. The heat exchange apparatus 4 includes an entrance 5 and an exit 6 to provide for a flow of fluid therethrough. In the heat exchanger 4, the temperature of the water-methanol solution is reduced by the fluid flow therethrough, causing the water to form small particles of ice in the methanol as a slurry. The ice particles are kept in suspension in the methanol through the pumping action of the pump 2 in circulating the mixture or through other well known agitation devices. In this respect, the ice particles are said to be fluidized and their suspension and continuous agitation provide a high rate of heat transfer of the latent heat of fusion of the ice to the methanol and thence to the fluid flow through the heat exchanger. The exchanger 4 may be any device effective in transferring heat, and as an example of one application to which this invention is suitably adapted, the heat exchanger 4 may be an evaporator of the domestic type heat pump. It is well known that such heat pump units may be less effective when the outdoor temperature is extremely low; therefore, heat may be supplied to the heat pump during periods of extremely low temperature by the disclosed system of this invention. After circulation through the heat exchanger 4, the slurry mixture is pumped through conduit 7 to return to the container 1. The process may be continued until substantially all the latent heat of fusion is absorbed and the heat storage liquid is essentially solidified.

This situation exists at the completion of a cycle of operation and provision may be made to stop the process at this time.

Between shorter periods of operation heat may be applied to the container 1 or to the heat exchanger 4 to reduce the sludge or slurry to a more liquid form. As illustrated in FIG. 1 heating means 9 which may be an electrical resistance coil, or a heat exchanger coil and the like is utilized to provide this heat. The source of heat is preferably the heat pump unit itself which may contain excess heat energy during various periods of operation; however, any suitable source of heat including solar energy and ambient exposure may be utilized both between short periods of operation and at or near the completion of a cycle if necessary.

It is to be understood that various modifications and refinements are applicable without departure from the scope of this invention. Of the more prominent refinements, it is well to mention that container 1 includes a vent 8 for operation at atmospheric pressure. However, this system may be operated at pressures below as well as above atmospheric. It may also be mentioned that under certain conditions the system may be partly or wholly insulated to conserve heat, and a further method of conserving heat or adding heat to the storage container may include the mounting of container 1 in heat exchange relationship to the warm parts of adjacent apparatus which the system may serve.

Plugging of the heat exchanger apparatus by the ice formation may also be prevented or minimized through various physical arrangements of the apparatus, or by additives to the circulating mixture. Included among the additives which may be employed is silicone oil, which, it has been found, will minimize ice formation on the heat exchanger walls.

Figure 2:
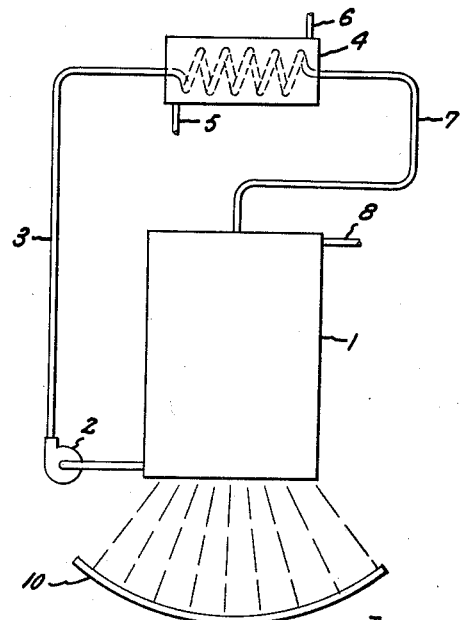
FIG. 2 shows a second embodiment of this invention utilizing solar energy.

The dynamic system heretofore described may be utilized in connection with solar energy as a heating unit. A working medium for this type of system may be a suitably proportioned solution of disodium acid phosphate dodecahydrate with water, which may begin solidifying at a predetermined temperature. One simplified form of this invention as illustrated in FIG. 2 includes a container 1 cooperatively arranged with a suitable solar energy deriving apparatus 10, a pump 2, and a heat exchanger 4, connected to the container 1. Solar heat melts the solidified portion of the solution, which is then pumped through a heat exchanger or radiator 4. In the radiator, the solution partially solidifies, giving off latent heat of fusion, and is then returned to the container 1 for, again, melting by solar heat. One additional advantage of this application is the ability to circulate the working component directly to the point of heat absorption and to the point of heat release.

While other modifications of this invention and variations of apparatus which may be employed within the scope of this invention have not been described, the invention is intended to include all such as may be embraced within the following claims.

What we claim as new and desire to secure by Letters Patent of the United States is:

1. In a closed cycle latent heat recovery system utilizing a liquid medium comprising a solution of disodium phosphate and water, the method which comprises, selecting and proportioning said disodium phosphate in relation to said water to solidify at a predetermined temperature range, circulating said medium from a storage container to a heat exchanger, causing particle solidification of said disodium phosphate and a concurrent release of latent heat diffusion to said heat exchanger, maintaining the solidified particles in a fluidized state, returning the resultant liquid-solid mixture to said storage container, and adding heat to said liquid-solid mixture to reduce the solids to liquid form.

2. A closed cycle heating system comprising in combination, a container, a disodium phosphate and water solution in said container, said solution being chosen to precipitate solids at a predetermined temperature, a heat exchanger operatively connected to said container, pumping means operatively connected to said container to circulate said solution to said heat exchanger wherein the solution precipitates solids for release of latent heat of fusion in said heat exchanger, means including the said pump and the said solution to maintain fluidization of the solids in said heat exchanger, said pumping means returning the resultant liquid-solid mixture to said container, and means to add heat to said container to reduce the solids therein to liquid form.

3. The invention as claimed in claim 2 wherein the added heat is in the form of solar energy.

References Cited in the file of this patent

UNITED STATES PATENTS

| | | |
|---|---|---|
| 2,436,281 | Bartlett et al. | Feb. 17, 1948 |
| 2,460,482 | Abbott | Feb. 1, 1949 |
| 2,544,474 | Swanton | Mar. 6, 1951 |
| 2,680,429 | Olsen | June 8, 1954 |
| 2,765,921 | Green | Oct. 9, 1956 |
| 2,791,204 | Andrus | May 7, 1957 |

FOREIGN PATENTS

| | | |
|---|---|---|
| 344,320 | Great Britain | Mar. 5, 1931 |
| 656,881 | Germany | Feb. 3, 1938 |
| 847,742 | France | July 10, 1939 |